Jan. 13, 1948.  W. P. MASON  2,434,278
SUBMARINE DETECTING DEVICE
Filed March 4, 1943  13 Sheets-Sheet 1

FIG. 1

INVENTOR
W. P. MASON
BY
*John Attall*
ATTORNEY

Jan. 13, 1948. W. P. MASON 2,434,278
SUBMARINE DETECTING DEVICE
Filed March 4, 1943 13 Sheets-Sheet 2

FIG. 2

INVENTOR
W. P. MASON
BY
ATTORNEY

FIG. 3

Jan. 13, 1948.  W. P. MASON  2,434,278
SUBMARINE DETECTING DEVICE
Filed March 4, 1943  13 Sheets-Sheet 4

FIG. 4.

INVENTOR
W. P. MASON
BY *John Hall*
ATTORNEY

Jan. 13, 1948.   W. P. MASON   2,434,278
SUBMARINE DETECTING DEVICE
Filed March 4, 1943   13 Sheets-Sheet 5

INVENTOR
W. P. MASON
BY John A. Hall
ATTORNEY

Jan. 13, 1948. W. P. MASON 2,434,278
SUBMARINE DETECTING DEVICE
Filed March 4, 1943 13 Sheets-Sheet 7

INVENTOR
W. P. MASON
BY John A. Hall
ATTORNEY

Jan. 13, 1948.     W. P. MASON     2,434,278
SUBMARINE DETECTING DEVICE
Filed March 4, 1943     13 Sheets-Sheet 12

INVENTOR
W. P. MASON
BY
ATTORNEY

Jan. 13, 1948.　　　W. P. MASON　　　2,434,278
SUBMARINE DETECTING DEVICE
Filed March 4, 1943　　　13 Sheets-Sheet 13

FIG. 15

INVENTOR
W. P. MASON
BY John Attall
ATTORNEY

Patented Jan. 13, 1948

2,434,278

UNITED STATES PATENT OFFICE 2,434,278

SUBMARINE DETECTING DEVICE

Warren P. Mason, West Orange, N. J., assignor to Bell Telephone Laboratories, Incorporated, New York, N. Y., a corporation of New York Application March 4, 1943, Serial No. 477,916

10 Claims. (Cl. 177—386)

This invention relates to locating devices and particularly to that class of devices by which supersonic vibrations set up by propellers of ships are located in direction.

The principle by which the geographical location of a source of sound or vibrations may be fixed is well known. The object of the present invention is to provide a portable device which may be temporarily laid on the bed of the ocean and connected to an observation point by a submarine cable and which will be rugged, accurate and economical.

In accordance with the invention an array of piezo-electric crystals in the form of a triangular device each leg of which constitutes a frequency prism is employed. Each of the said legs of the triangle consists of a plurality of crystals connected in a network to produce a prismatic effect so that by observation an angular determination may be made from each leg. Two such observations will determine the azimuth and colatitude angles of the source of vibrations and this may be checked by observation of the third leg.

It has been known heretofore to use three microphones at the apices of a triangle to make location determinations of foreign disturbances by trigonometric methods, the plane of the triangle being adjusted until a line normal to the said plane points directly at the source of the disturbance. In the present case, however, the plane of the triangle is to be adjusted on as nearly a horizontal plane as possible and then left stationary the determination of the required direction being made as the intersection of two planes, the angle of approach to each of two legs being determined by the prismatic character of the crystal array and the electrical networks in which the said two legs are connected. The adjustment is not made herein by balancing methods as in the prior art but rather by angular prismatic determination, for a complete understanding of which reference is made to my copending applications one entitled "Pipe antennas and prisms" Serial No. 381,236, filed March 1, 1941, Patent 2,408,435, and another entitled "Prismatic and high power compressional wave radiators and receivers" Serial No. 431,558 filed February 19, 1942, Patent 2,404,391.

A feature of the invention is a triangular device each leg of which contains an array of crystals and a circuit network for the directional location of a source of vibrations.

Another feature of the invention is a triangular device each leg of which may be used as an angle detector and in which any two legs will definitely determine the direction of a source of vibrations. Where one leg may be oriented in such a manner that the incoming waves strike at outside its most sensitive range the other two legs may be used for the test.

Another feature of the invention is a straight line array of piezoelectric crystals in an electrical network which defines the angle of approach of compressional waves between the locator and the source of disturbance as a function of the frequency detected, said crystal array being rendered more accurate in its response by means in said network to render the said crystals progressively more sensitive from the ends of said array to the middle thereof. For a more complete and detailed explanation of the phenomenon of the suppression of secondary lobes reference is made to my copending application entitled "Radiating systems" Serial No. 407.457, filed August 19, 1941, now Patent No. 2,411,551 dated November 26, 1946.

The drawings consist of thirteen sheets having sixteen figures, as follows.

Figure 1:
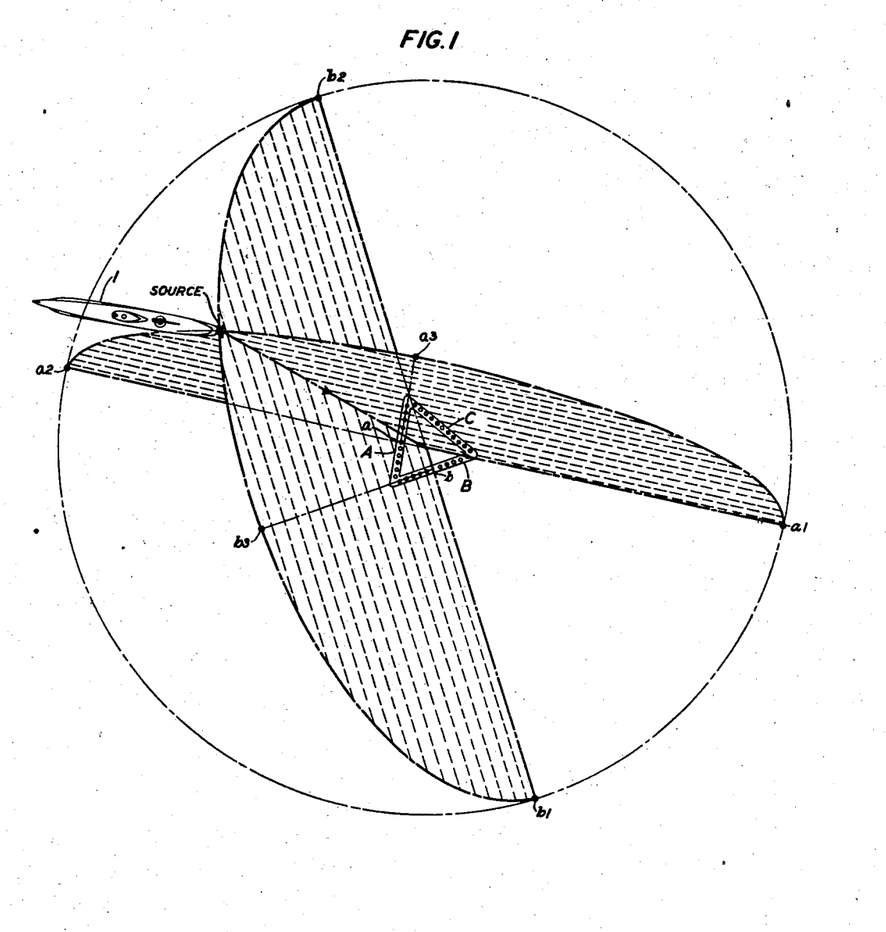
Fig. 1 is a geometrical diagram, being a plan of the intersection of two planes which are indicated in perspective and showing the line formed by the intersection thereof running from a detecting instrument to a source of disturbance.

In Fig. 1 a vessel 1 is shown whose propeller is a source of disturbance. Located at some distance therefrom is a triangular prism having the three legs A, B and C. This prism will be located in a horizontal position on the bed of the sea and the vessel will be located above it, either on the surface of the sea or submerged. The problem is to determine the azimuth and colatitude angles of the line extending from the theoretical center of the triangular prism to the source of disturbance and this may be done by calculating the intersection of at least two planes experimentally fixed by the electrical response of the different legs of the prism.

For purposes of illustration, the center of the prism is used as a center point of a hemisphere, somewhere in whose surface lies the source of disturbance. The circle shown by the dot and dash line is the horizontal trace of the hemisphere in whose plane the triangular prism is located. Two planes, one determined by the leg A and one determined by the leg B are defined each by a diameter of the said circle and by the great circle trace of the plane as it cuts the hemispherical surface. The plane determined by the leg A is shown by the shaded surface within the area defined by the horizontal surface straight line $a2$, $a$, $a1$, which is normal to the longitudinal axis of the leg A, and the great circle trace $a2$, $a3$, $a1$, which passes through the source of disturbance. Likewise, the plane determined by the leg B is shown by the shaded surface within the area defined by the horizontal surface straight line $b2$, $b$, $b1$, which is normal to the longitudinal axis of the leg B, and the great circle trace $b2$, $b3$, $b1$, which also passes through the source of disturbance. The intersection of these two planes is a straight line extending from the source of disturbance to the center of the prism.

The plane determined by the leg A may be said to be determined by two straight lines, one the line $a2$, $a$, $a1$, lying in a horizontal plane and at right angles to the longitudinal axis of the leg A, and another $a$, $a3$, at right angles to the first line but at a measurable angle to the horizontal plane. This is known as the angle of approach and is that angle which the leg A will measure in accordance with the principles set forth in my copending applications, heretofore mentioned. This angle, shown as angle $\alpha$ may be visualized more clearly in perspective of Fig. 2. The corresponding angle $\beta$ defining the plane determined by the leg B may be even more clearly seen in Fig. 2.

Figure 2:
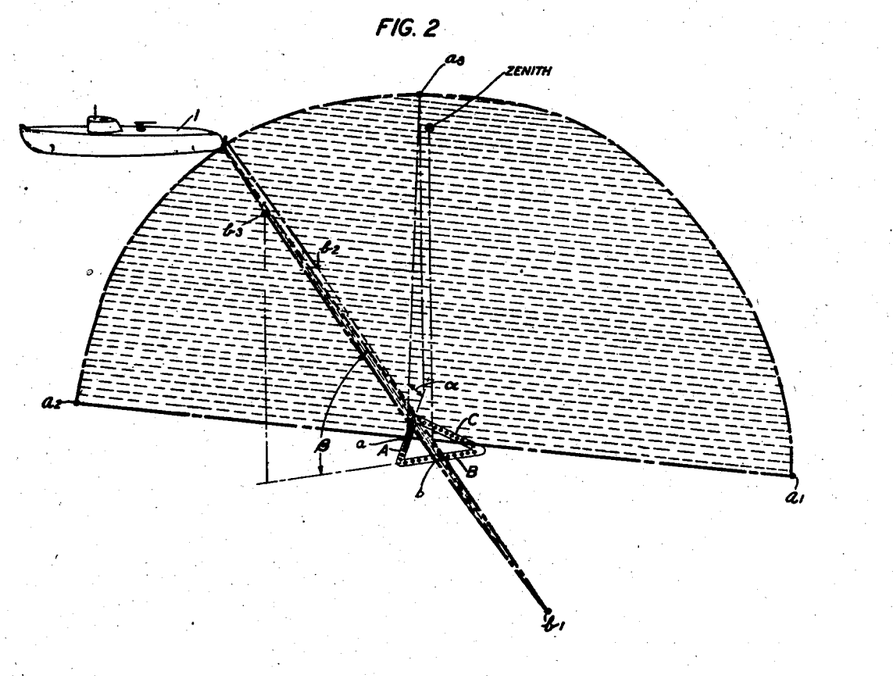
Fig. 2 is a perspective view of the same.

Thus by electrical measurements of the frequency of the incoming waves from the source of disturbance the angles $\alpha$ and $\beta$ may be determined and these determine the planes whose intersection is the straight line between the center of the triangular prism and the source of disturbance.

A third angle which may be termed $\lambda$ may be determined by the leg C and may be used as a check. Practically the three angles are all measured and those two which are closest to ninety degrees are selected for use since the greatest accuracy is attained when the incoming wave is in a plane normal to the longitudinal axis of the prism.

Figure 3:
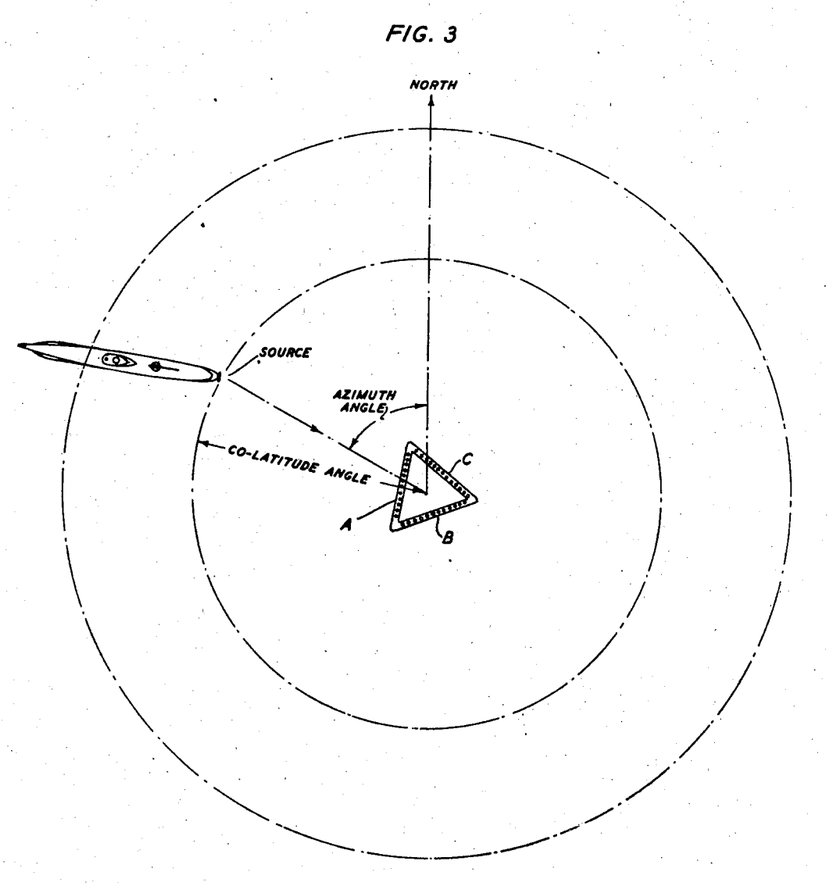
Fig. 3 is another geometrical figure, being a plan of the angles determined by the line from the detecting instrument to the source of disturbance.
Figure 4:
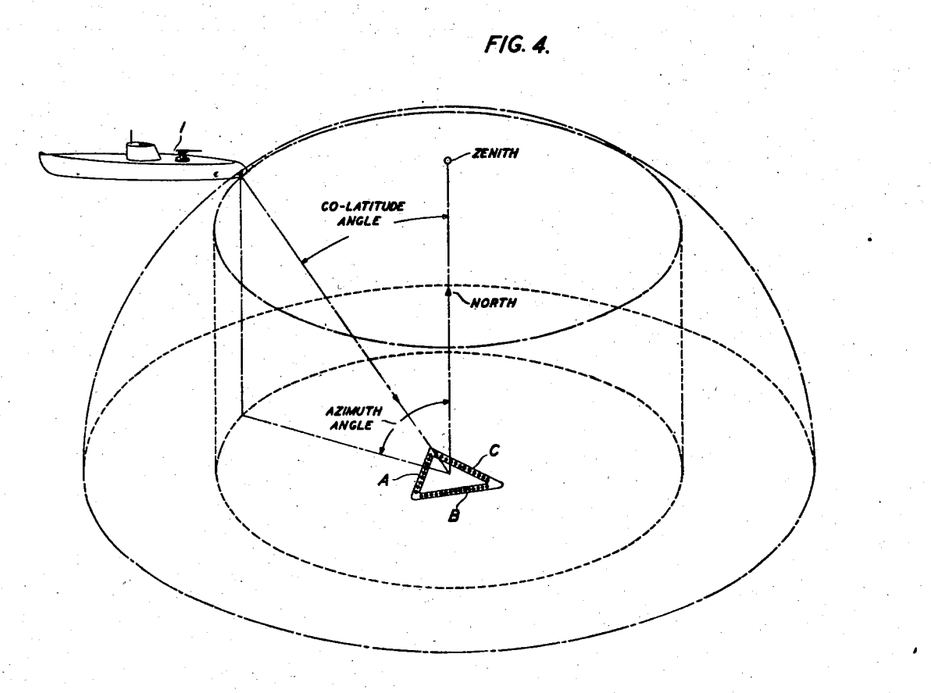
Fig. 4 is a perspective view of the same.

Now considering Figs. 3 and 4, the direction of the source of disturbance may be located by calculation. The line from the center of the prism to the source of disturbance being known, the azimuth angle may be calculated. This as seen most clearly from Fig. 3 is the angle from a given reference line, here the line from the center of the prism due north, to the projection on the horizontal plane of the determined line from the center of the prism to the source of disturbance. The colatitude angle may also be calculated. This is the angle between a line from the center of the prism to the zenith and the determined line from the center of the prism to the source of disturbance, best illustrated in Fig. 4.

Thus by the response of the different legs of the prism, first the angles $\alpha$, $\beta$ and $\lambda$ are measured. These may be translated by calculation, through the intersection of two planes into the azimuth and colatitude angles of the source of disturbance so that by plotting methods the direction of the source of disturbances may be definitely located in reference to known objects (including the triangular prism) and landmarks.

Figure 5:
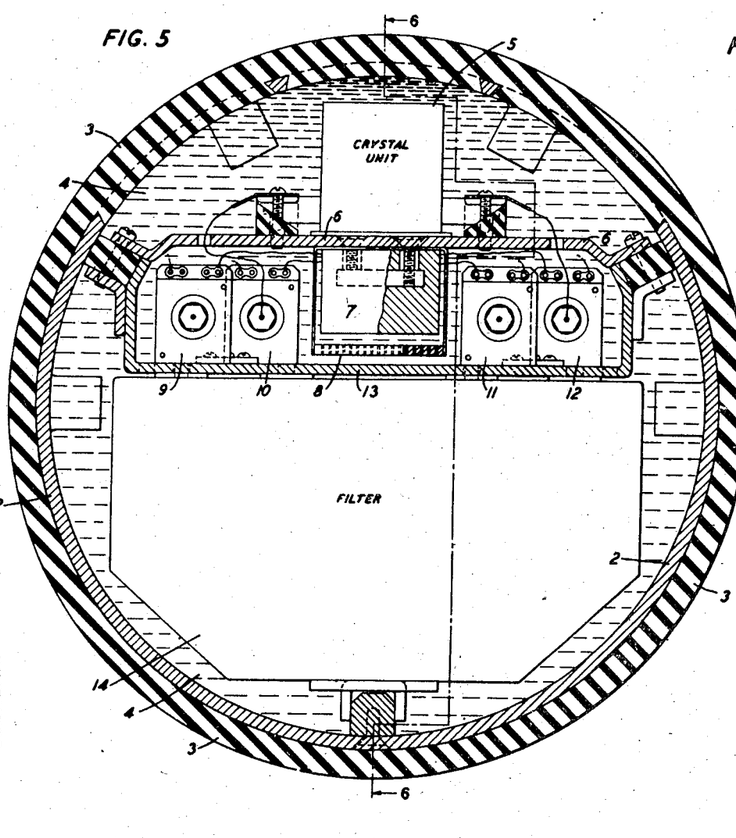
Fig. 5 is a vertical cross-section of one leg of the triangular prism.
Figure 6:
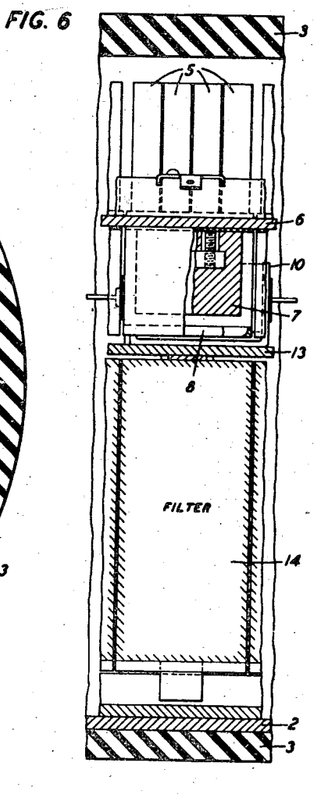
Fig. 6 is a fragmentary, vertical cross-section of the same taken among the longitudinal axis thereof.

The construction and arrangement of the triangular prism is shown in Figs. 5 and 6. One leg of the prism as will appear more fully hereinafter contains certain apparatus not present in the other legs and it is that leg which is shown. The leg is in the form of a steel tube or shell 2 entirely covered with rubber 3. At the top so-called "windows" are cut out so that only the rubber 3 is interposed between the sea water on the outside and the liquid medium 4 in which all the apparatus on the inside is submerged.

The apparatus consists of piezoelectric crystal units 5 mounted on a plate 6 in cooperative relationship with a lead backing resonator 7. A short space below the active face of the backing resonator 7 there is located a slotted plate 8 which acts as a means to attenuate the vibrations from the active face of the backing resonator in accordance with the principles set forth in my copending application, Serial No. 470,837, filed December 31, 1942, now Patent No. 2,415,832 dated Feb. 18, 1947.

There are also a plurality of relays 9, 10, 11 and 12 mounted on the plate 13 which may be generally of the type shown in Patent 2,303,933 granted December 1, 1942, to D. A. S. Hale. These relays will not be present in the other two legs of the prism. Below the plate 13 there is mounted a container 14 holding the elements of a filter used in the electrical circuit of the device to produce the prismatic effect. As before stated all this apparatus is immersed in the liquid medium 4, generally castor oil.

It will be seen that the crystal units may transmit their vibrations or receive incoming vibrations through the rubber windows which are designed to have as nearly as possible the same impedance as the liquid medium within the device and the sea water without.

Figures 7, 8:
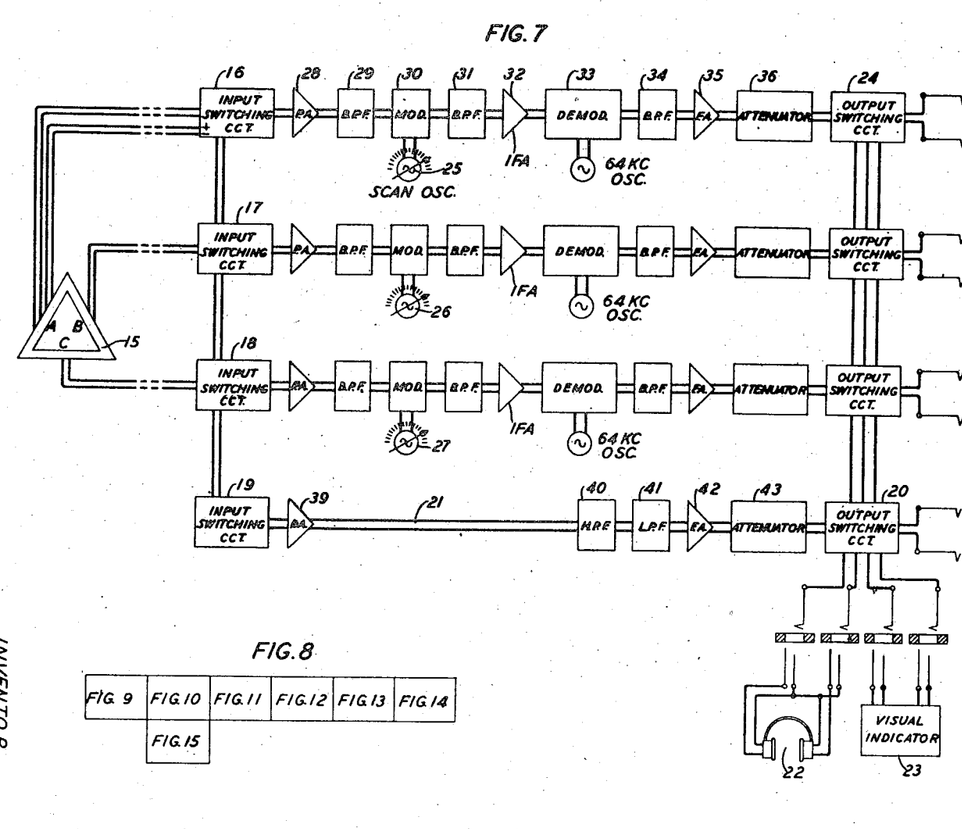
Fig. 7 is a schematic circuit diagram showing the general layout of the triangular prism and the circuit connections of the testing means connected thereto for determination of the azimuth and colatitude angles of the source of disturbance.
Fig. 8 is a block diagram showing how the figures on the remaining sheets may be placed to form a complete circuit diagram of the arrangement shown schematically in Fig. 7.
Figure 16:
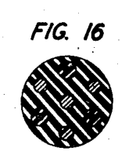
Fig. 16 is a cross-sectional view of the construction of the cable by which the triangular prism circuit is connected to the detecting circuits.

The operation of the device may be seen from the schematic circuit diagram of Fig. 7. The triangular prism 15 is shown at the left and its three legs are designated A, B and C as in previous figures. Each leg is connected by a two conductor channel to a testing channel and in addition the leg A is shown as having an extra two conductors extending thereto for switching purposes to be more fully described hereinafter. Three testing channels are provided for individually determining the frequency of incoming waves. In addition, a fourth testing channel is provided as an "alert" testing means. In use the triangular prism is placed on the bed of the sea and connected to the testing means either aboard a stationary vessel or in some housing provided therefor on land. The connection is by means of a submarine cable shown in cross-section in Fig. 16. The device is portable in that the triangular prism may be hauled up and relocated at will and the testing apparatus may be transported to any other convenient location.

By means of the switching circuits 16 to 20, any one or all of the legs of the prism may be connected through the alert channel 21 to the earphones 22 or any other responsive device such as 23 here labeled as a "visual indicator" such as an oscilloscope. Usually by means of the relay switching means within the leg A such leg is rendered non-directional in its response to incoming waves and then connected to the alert channel so that a continuous vigil may be kept. When an indication is received so that the operator knows a source of disturbance is within the range of the detecting device the earphones 22 or the indicating device 23 is individually connected to each channel in turn and the control of the scanning oscillator is manipulated until proper readings are determined. By means of the input switching circuit 16 and the output switching circuit 24, the earphones 22 or the indicator 23 may be individually connected to the leg A of the prism. With this leg rendered directional, the control of the scanning oscillator 25 is manipulated until a definite indication is obtained. The control 25 may be calibrated to read values of the angle $\alpha$ directly. By then changing the indicator to work over the channel connected to leg B a reading of the angle $\beta$ may be obtained on control 26 and these two readings may then be used to calculate the azimuth and colatitude angles of the source of disturbance. This result may be checked by taking a reading of the angle $\lambda$ by control 27.

Each testing channel contains a series of electrical networks as, a preliminary amplifier 28, a band-pass filter 29, a modulator 30, another band-pass filter 31, an intermediate frequency amplifier 32, a demodulator 33, another band-pass filter 34, a final amplifier 35 and an attenuator 36. There is also provided a pair of jacks 37 and 38 by means of which some indicating device or other network may be connected to the output of each testing channel.

The alert channel 21 is less complicated in that no adjustments need be made. There is a preliminary amplifier 39, a high-pass filter 40, a low-pass filter 41, a final amplifier 42 and an attenuator 43. A patching cord 44 is shown as available to make connection from any one of the jacks shown to other apparatus as occasion and circumstances may demand.

The block diagram of this Fig. 7 comprises what may be termed a receiver and in the short description to follow, certain values are given by way of example. The receiver consists of four channels. One, called the "alert channel," is for the purpose of determining the presence of a signal at the input, while the other three, called "scanning channels," are for the purpose of identifying the frequency of the input signal. The alert channel consists of two voice frequency amplifiers with attenuators at their inputs and two filters, a high-pass and a low-pass filter, whose purpose is to limit the useful frequency range to the band extending from 1 kilocycle to 10 kilocycles. A scanning channel consists of a preamplifier with an attenuator at its input, a modulator and associated variable carrier oscillator with an adjustable attenuator at the input of the modulator and a band-pass filter to limit the received signals to the band extending from 7.5 kilocycles to 15 kilocycles. The output of the modulator operates into another band-pass filter whose pass band extends from 60 kilocycles to 64 kilocycles. The output of this band-pass filter is connected to the input of an intermediate frequency amplifier giving maximum gain at 62.9 kilocycles. This intermediate frequency amplifier works into the input of a demodulator having a crystal-controlled carrier frequency of 64 kilocycles. At the output of this demodulator is a very narrow band-pass filter limiting the received frequencies to 1100 cycles $\pm$ 50 cycles. This band-pass filter works into a final amplifier which has at its input an attenuator adjustable in two steps.

In more detail we may now consider the circuits indicated in Fig. 8.

Figure 9:
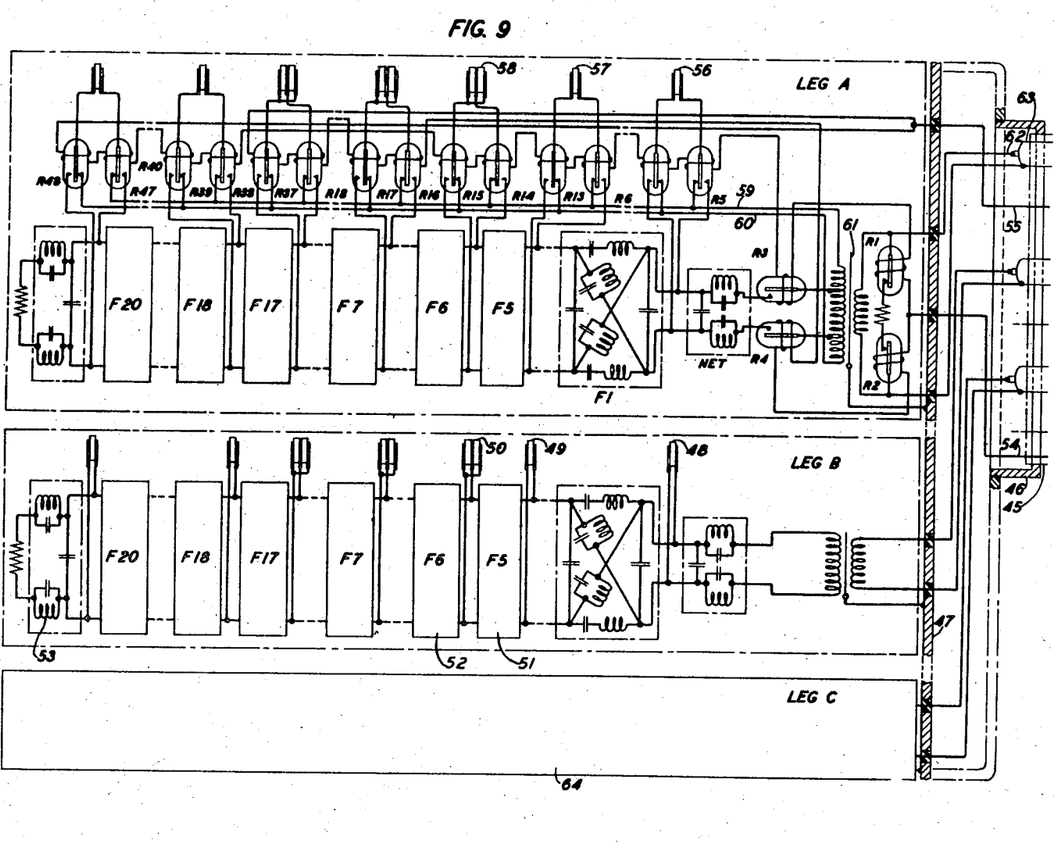
Fig. 9 is a circuit diagram showing the circuit arrangement, partly in schematic, of two legs of the triangular prism, and the third leg as a block.

Looking now at Fig. 9, there is shown to the right a schematic representation of the gland through which the conductors of the submarine cable are brought into the triangular prism. The numeral 45 designates the sheath of the cable which is secured by a water-tight fit to the gland member 46. The various conductors of the cable are then played out and led through properly insulated holes in a bulkhead plate 47, to the electrical networks of each leg.

Each leg constitutes a prism. The leg B contains a plurality of crystal elements 48, 49, 50 and so on between each of which is a filter like that shown in detail between the crystals 48 and 49 and those indicated by the rectangles 51, 52 and so on. At the end of the circuit there is a terminating network 53. By this arrangement a prismatic effect is secured, that is the circuit functioning as a receiver is selectively responsive to different frequencies of incoming waves in accordance with the angle of approach, this angle being measured with reference to the longitudinal axis of the device. The reasons for such action are fully explained in my copending applications hereinbefore referred to. It should also be noted that the crystals are of different dimensions. This is part of the arrangement by which the crystals are arranged to be progressively more sensitive from the ends toward the middle of said crystal array for the purpose of suppressing secondary lobes all more fully explained in my copending applications hereinbefore referred to.

The leg A is somewhat more complicated, by the inclusion of a plurality of relays designated R1, R2, R3 and so forth. These relays are in two series circuits which are in multiple with each other and connected to the conductors 54 and 55. Relays R1, R3, R5, R6, R13, R14, R15, R16, R39, R40, R47 and R48 are shown in one series circuit and the remainder in the other. Actually there are twenty-four relays in each circuit, certain of them being omitted from the drawings for sake of clearness. With the relays in their normal positions as shown, each of the crystals 56, 57, 58 and so on is connected in multiple to the conductors 59 and 60 and thence to one winding of the transformer 61. The other winding of the transformer 61 is connected to the coaxial line indicated by the central conductor 62 and its sheath 63. In this arrangement the leg A acts as a simple hydrophone and will respond to incoming waves over a wide range of frequencies.

When the conductors 54 and 55 are connected at the distant end to a source of current the relays will operate and convert the leg A to a prismatic device, including the various filters and networks to produce the desired result, the same as leg B shown in some detail and the leg C indicated by the rectangle 64.

Figure 10:
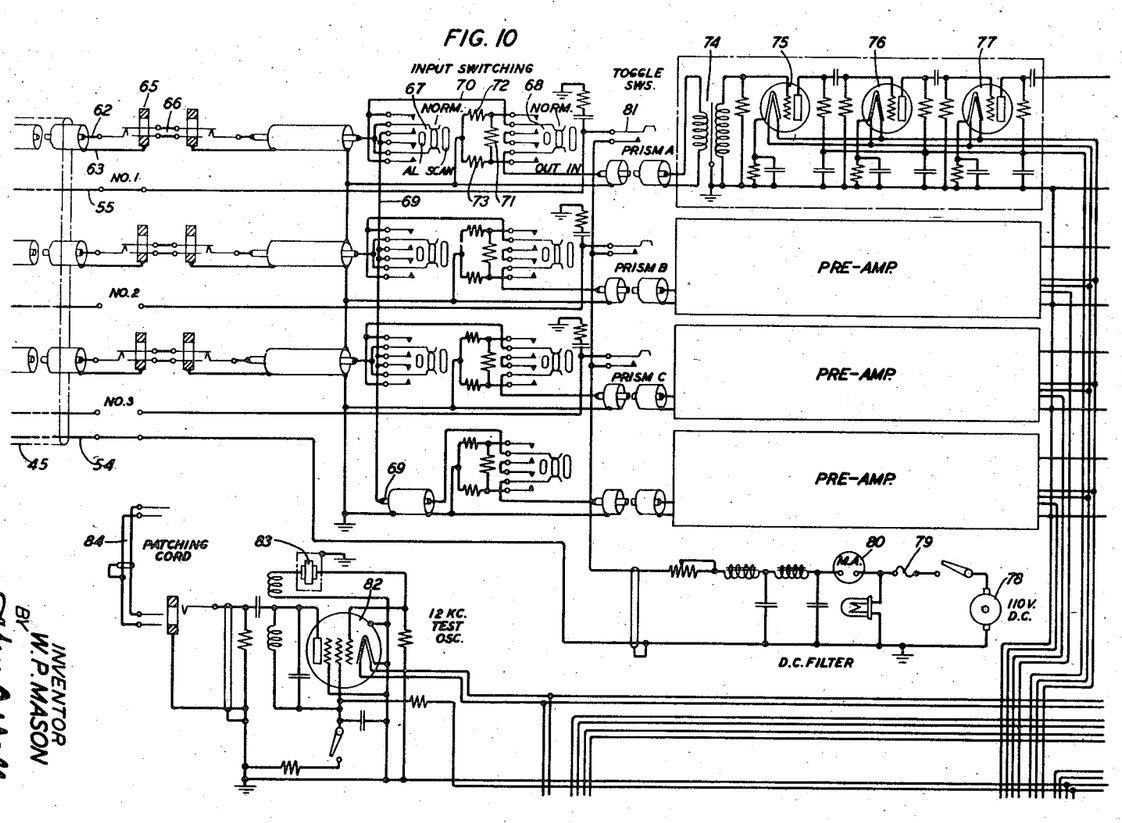
Fig. 10 shows the input switching circuits and the preliminary amplifiers.

At the other end of the cable, shown in Fig. 10, the coaxial line terminates in a jack 65 by which the conductors 62 and 63 may be patched by the patching cord 66 to the terminals of the testing channel. The first circuit encountered thereafter is the input switching arrangement. This comprises two keys 67 and 68 both shown in their normal positions. Key 67 in its normal position leaves the extension of conductor 62 open. In one position key 67 extends this conductor to conductor 69 leading to the alert channel and in another position to conductor 70. Key 68 in one position connects the conductor 70 directly to the conductor leading to the preliminary amplifier, and in another position includes an attenuating pad consisting of a series resistance 71 and two shunt resistances 72 and 73 in this connection. It may be noted that in operation the incoming signal is attenuated as much as possible at first and that gradually and until a sufficient signal is received this attenuation is reduced.

The preliminary amplifier is of conventional design and consists essentially of a transformer 74 and three triodes 75, 76 and 77 in cascade.

Below the three preliminary amplifiers is shown a source of current for operating the relays of the leg A. This consists of a source of direct current 78, the usual fuse 79, a milliammeter 80 and the usual smoothing network. By means of key 81 this source of current may be connected to the conductor 55 to operate the relays in leg A.

Also in Fig. 10 there is shown a pentode 82 controlled by a crystal 83 in a conventional oscillator circuit for use as a test device. By means of a patching cord 84 this source of current may be connected into the network at various convenient places to test the proper operation thereof.

Figure 11:
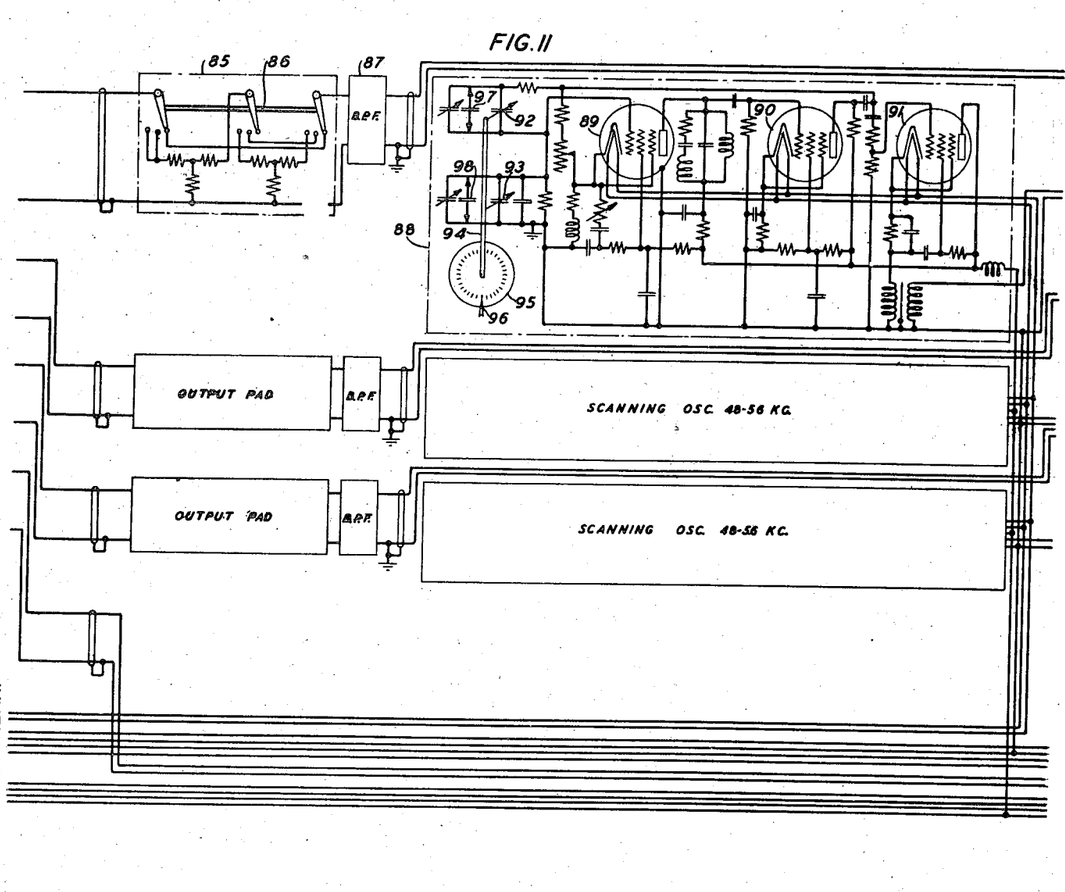
Fig. 11 shows the output pads, the band-pass filters and the scanning oscillators next in line.

In Fig. 11 the testing channel may first be traced through an output pad 85 which is an attenuator controlled by a three position manually operated switch 86 to introduce series and shunt resistances into the channel in various obvious combinations.

Next in line is a band-pass filter 87 indicated and of conventional design. This filter is designed to pass only frequencies of 7.5 kilocycles to 15 kilocycles which are expected to be detected and which may be modulated with the apparatus provided.

The next circuit network shown but not the next in line is the scanning oscillator generally included in the rectangle 88. This is an oscillator of conventional design consisting generally of the three pentodes 89, 90 and 91 and controlled by the variable condensers 92 and 93 by a common shaft 94 moving a dial 95 by a fixed pointer 96. The range of this oscillator is from 48 kilocycles to 56 kilocycles and is designed for cooperation with the range of the crystal array prisms and the dial 95 may be calibrated, as before stated, to read the angles α, β or λ directly. The condensers 97 and 98 are permanently wired in the circuit after their values have been selected to bring the mid-reading of the calibrated dial 95 to the proper point.

Figure 12:
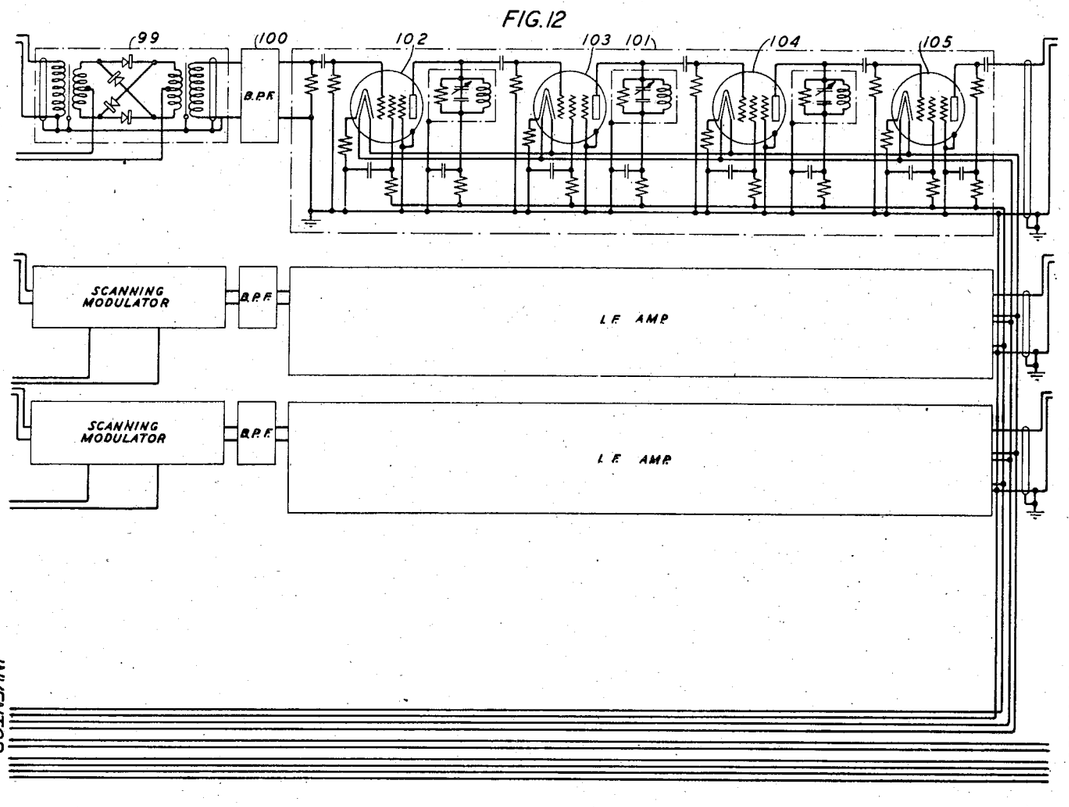
Fig. 12 shows the scanning modulator, the band-pass filters and the intermediate frequency amplifiers next in line.

The next circuit element in line is a modulator 99 of conventional design shown in Fig. 12. By means of this network the incoming signal is modulated with the output of the scanning oscillator to produce an intermediate frequency signal.

Following this is a band-pass filter 100 designed to pass the said given frequency signal derived from the modulation of the incoming signal. This will be between 60 kilocycles and 64 kilocycles and may be varied by the movement of dial 95. The output of this band-pass filter is then amplified by the intermediate frequency amplifier 101 consisting of four pentodes 102, 103, 104, and 105 in an amplifier circuit which is designed to give a maximum output at 62.9 kilocycles so that by adjusting the dial 95 until the maximum signal has been attained the operator will know that the signal has been modulated to exactly 62.9 kilocycles.

Figure 13:
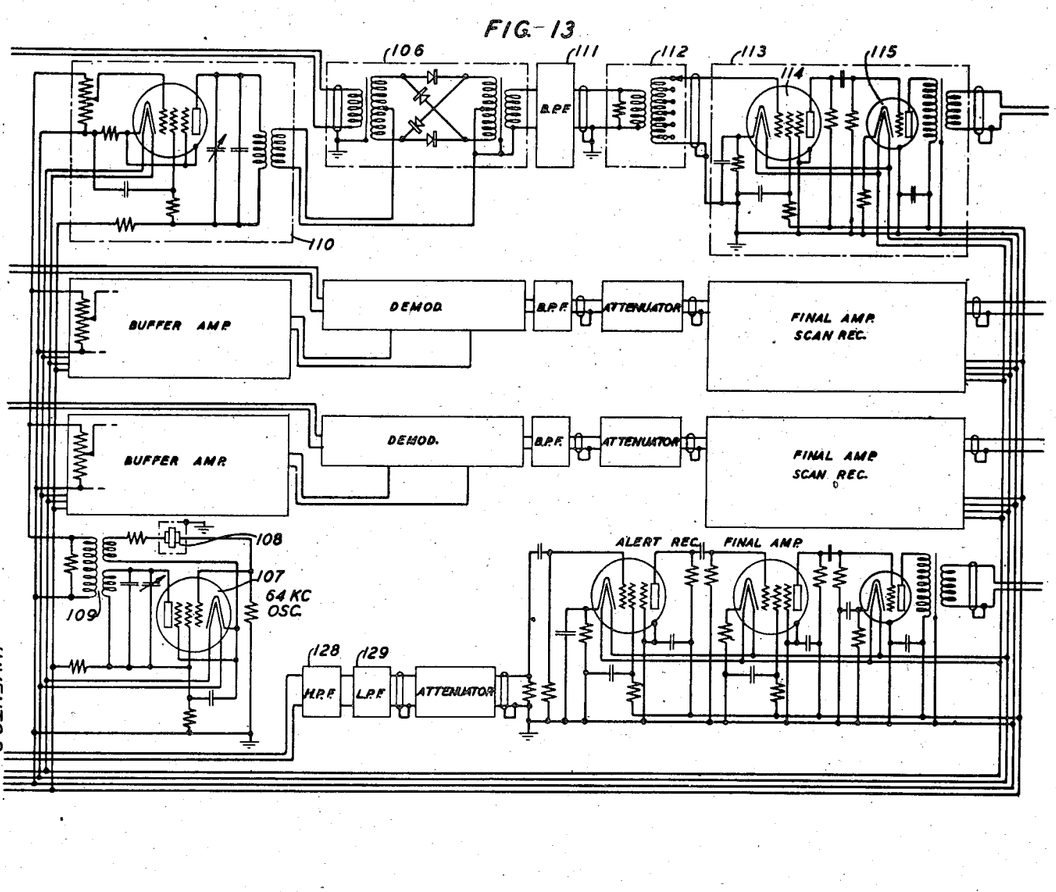
Fig. 13 shows the buffer amplifiers, the demodulator, the band-pass filters, attenuators and final amplifiers next in line, as well as certain circuit elements of the alert channel.

Following the intermediate frequency amplifier in line and shown in Fig. 13 there is a demodulator 106. This apparatus is served by a crystal controlled oscillator consisting essentially of the pentode 107, the crystal 108 and the transformer 109, the output of which is coupled with the demodulator 106 by the buffer amplifier 110. The output of the oscillator is 64 kilocycles so that the output of the demodulator is in the neighborhood of 1,000 cycles. Actually the band-pass filter 111 is designed to pass a very narrow band of 1100±50 cycles so that the tuning of the receiver may be made very sharp. The output of the band-pass filter 111 is then passed through an attenuator 112 and then delivered to the final amplifier 113, consisting generally of pentode 114 and triode 115. The output of the final amplifier is then delivered to the switching arrangement of Fig. 14.

Figure 14:
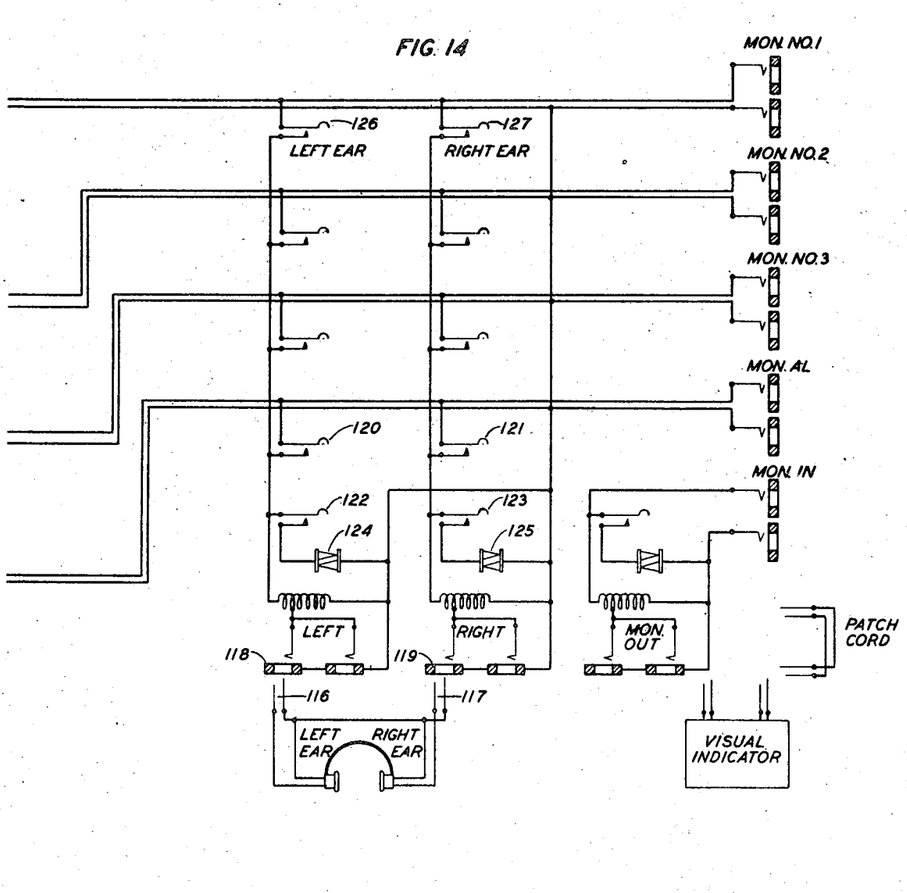
Fig. 14 shows the output switching circuit whereby the detecting device may be alternatively connected to different channels.

With plugs 116 and 117 in jacks 118 and 119 respectively and both keys 120 and 121 operated, the operator may listen in with both ears on the alert channel. Keys 122 and 123 when operated bridge the shock absorbing varistors 124 and 125 across the earphones and may be removed when a faint signal is being received. The operator detecting the presence of a disturbing influence may then restore keys 120 and 121 and operate keys 126 and 127 to listen in on the scanning channel for leg A. After making a satisfactory adjustment and taking a reading, he may then switch to another channel. It will be noted that with the arrangement provided, he may listen in with one ear to any one channel and with the other ear to another channel.

The elements in the alert channel are similar to the corresponding elements in the other channels with the exception of the high-pass filters 128 and 129 which together act to limit the frequency of the incoming signal to something between 1 kilocycle and 10 kilocycles.

Figure 15:
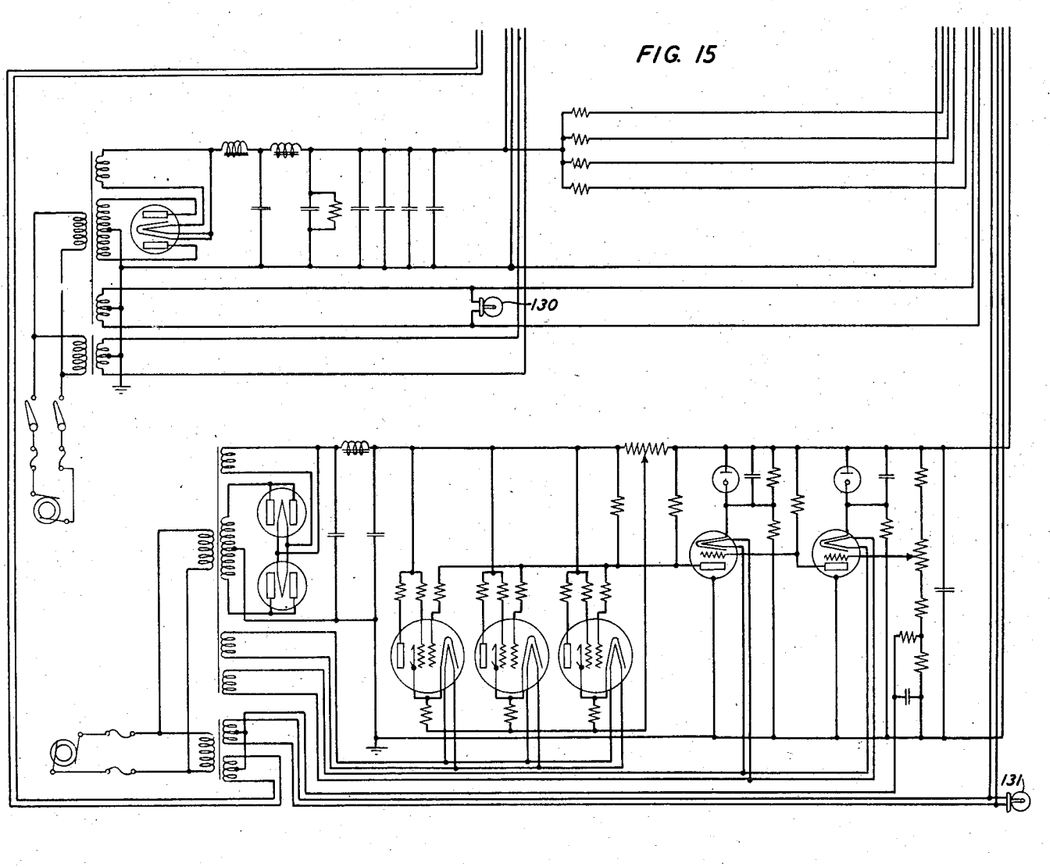
Fig. 15 shows circuit details of the power supply.

Fig. 15 shows details of power supply networks for heating the filaments of the various tubes and supplying the various potentials required thereby. No detailed description will be given as these are in many respects conventional circuits and the method of their operation is well known. They consist generally of transformers and rectifying tubes together with the usual smoothing networks. Two signal lamps 130 and 131 are provided to show the sources of current in operation.

What is claimed is:

1. A testing device for determining the direction of an incoming wave comprising a triangular structure each leg of which comprises a prismatic responsive device consisting of a plurality of piezoelectric crystals connected in an electrical network having phase shifting network elements between said crystals, whereby the response of any two of said legs determines the direction of a line from said device to the source of said incoming wave.

2. A locator for determining the direction of incoming compressional waves from a source of disturbance such as the propeller of a ship, comprising a triangular structure resting in a horizontal plane on the bed of the ocean, each leg of said structure comprising an array of piezoelectric crystals responsive to compressional waves transmitted through the sea water and an electrical network for rendering said crystal array prismatically responsive to said incoming frequency waves, whereby the response of any one leg of said device defines a plane having a first line normal to the longitudinal axis of said leg and a second line at right angles to said first line and at an angle to the axis of said leg equal to the angle of approach of said incoming frequency waves, and whereby the intersection of any two such planes defined by two corresponding legs defines a straight line between said triangular structure and the said source of disturbance.

3. A locator for determining the direction of incoming frequency waves from a source of disturbance such as the propeller of a ship comprising a triangular structure resting in a horizontal plane on the bed of the ocean, each leg of said structure comprising an array of piezoelectric crystals responsive to compressional waves transmitted through the sea water and an electrical network for rendering said crystal array prismatically responsive to said incoming frequency waves, said electrical network also being constructed and arranged to render said crystals progressively more sensitive from the ends toward the middle of said array whereby secondary lobes are suppressed, whereby the response of any one leg of said device defines a plane having a first line normal to the longitudinal axis of said leg and a second line at right angles to said first line and at an angle to the axis of said leg equal to the angle of approach of said incoming frequency waves, and whereby the intersection of any two such planes defined by two corresponding legs defines a straight line between said triangular structure and the said source of disturbance.

4. A submarine detecting and locating device for determining the presence and the direction of incoming compressional waves from a source of disturbance such as the propeller of a ship comprising an array of piezoelectric crystals, a network of filters, a plurality of relays, a circuit arrangement of said crystals controlled by said relays in one position thereof, wherein said crystals are responsive to a broad band of frequencies of incoming waves, an alternative circuit arrangement of said crystals and said filters controlled by said relays in another position thereof, wherein said crystals are prismatically and selectively responsive to narrow bands of frequencies of incoming waves, whereby the response of said device in said alternative arrangement defines a plane having a first line normal to the longitudinal axis of said device and a second line at right angles to said first line and at an angle to the axis of said device equal to the angle of approach of said incoming waves, and means for operating said relays to convert said device from a detecting to a locating means.

5. A submarine detecting and locating device for determining the presence and the direction of incoming compressional waves from a source of disturbance such as the propeller of a ship comprising a triangular structure resting in a horizontal plane on the bed of the ocean, each leg of said structure comprising an array of piezoelectric crystals responsive to compressional waves transmitted through the sea water and an electrical network for rendering said crystal array prismatically responsive to said incoming waves, whereby the response of any one leg of said device defines a plane having a first line normal to the longitudinal axis of said leg and a second line at right angles to said first line and at an angle to the axis of said leg equal to the angle of approach of said incoming waves, and whereby the intersection of any two such planes defined by two corresponding legs defines a straight line between said triangular structure and the said source of disturbance, one of said legs having in addition a plurality of relays, an electrical network controlled by said relays in an alternative position for rendering the said array of crystals therein broadly and non-directionally responsive to said incoming waves, and means for controlling said relays.

6. A locator for determining the direction of incoming compressional waves from a source of disturbance such as the propeller of a ship, comprising a triangular structure resting in a horizontal plane on the bed of the ocean, each leg of said structure comprising an array of piezoelectric crystals responsive to compressional waves transmitted through the sea water and an electrical network for rendering said crystal array prismatically responsive to said incoming frequency waves, whereby the response of any one leg of said device defines a plane having a first line normal to the longitudinal axis of said leg and a second line at right angles to said first line and at an angle to the axis of said leg equal to the angle of approach of said incoming frequency waves, and whereby the intersection of any two such planes defined by two corresponding legs defines a straight line between said triangular structure and the said source of disturbance, a receiver for measuring the response of said legs, and a submarine cable connecting said triangular structure and said receiver.

7. A locator for determining the direction of incoming compressional waves from a source of disturbance such as the propeller of a ship, comprising a triangular structure resting in a horizontal plane on the bed of the ocean, each leg of said structure comprising an array of piezoelectric crystals responsive to compressional waves transmitted through the sea water and an electrical network for rendering said crystal array prismatically responsive to said incoming frequency waves, whereby the response of any one leg of said device defines a plane having a first line normal to the longitudinal axis of said leg and a second line at right angles to said first line and at an angle to the axis of said leg equal to the angle of approach of said incoming frequency waves, and whereby the intersection of any two such planes defined by two corresponding legs defines a straight line between said triangular structure and the said source of disturbance, a receiver having a testing channel corresponding to each leg of said device for measuring the response of said corresponding leg, and a submarine cable connecting said triangular structure and said receiver.

8. A submarine detecting and locating device for determining the presence and the direction of incoming compressional waves from a source of disturbance such as the propeller of a ship comprising a triangular structure resting in a horizontal plane on the bed of the ocean, each leg of said structure comprising an array of piezoelectric crystals responsive to compressional waves transmitted through the sea water and an electrical network for rendering said crystal array prismatically responsive to said incoming waves, whereby the response of any one leg of said device defines a plane having a first line normal to the longitudinal axis of said leg and a second line at right angles to said first line and at an angle to the axis of said leg equal to the angle of approach of said incoming waves, and whereby the intersection of any two such planes defined by two corresponding legs defines a straight line between said triangular structure and the said source of disturbance, one of said legs having in addition a plurality of relays, an electrical network controlled by said relays in an alternative position for rendering the said array of crystals therein broadly and non-directionally responsive to said incoming waves, means for controlling said relays, a receiver having four testing channels comprising an alert channel for detecting the response of said one leg when converted to a broad non-directional responsive device and three other channels one each corresponding to a leg of said triangular device for measuring the angular response thereof, and a submarine cable connecting said triangular structure and said receiver.

9. A testing device for determining the direction of an incoming signal in the form of compressional waves of a broad band of frequencies, comprising a plurality of responsive devices, each said responsive device being selectively responsive to a single frequency of said broad band of frequencies in accordance with the angle of approach of said signal to said responsive device, said plurality of responsive devices being geometrically arranged with respect to each other in a known configuration whereby the response of at least two of said devices will provide sufficient data for mathematically computing the direction of said incoming signal.

10. A testing device for determining the direction of an incoming signal in the form of compressional waves of a broad band of frequencies, comprising a plurality of responsive devices, each said responsive device being selectively responsive to a single frequency of said broad band of frequencies in accordance with the angle of approach of said signal to said responsive device, said plurality of devices being geometrically arranged in a horizontal plane with respect to each other in a known configuration and the orientation of said testing device with respect to a known reference line being known, whereby the selective response of at least two of said responsive devices will provide sufficient data for mathematically computing the direction of said incoming signal.

WARREN P. MASON.

REFERENCES CITED

The following references are of record in the file of this patent:

UNITED STATES PATENTS

| Number | Name | Date |
|---|---|---|
| 2,169,304 | Tournier | Aug. 15, 1939 |
| 1,378,960 | Horton | May 24, 1921 |
| 1,411,948 | Williams | Apr. 4, 1922 |

FOREIGN PATENTS

| Number | Country | Date |
|---|---|---|
| 279,878 | Great Britain | Mar. 8, 1928 |